(12) United States Patent
Radtke et al.

(10) Patent No.: US 7,488,537 B2
(45) Date of Patent: Feb. 10, 2009

(54) CERAMIC IMPREGNATED SUPERABRASIVES

(76) Inventors: Robert P. Radtke, 2103 River Falls Dr., Kingwood, TX (US) 77339-3154; Andrew Sherman, 9181 Boyer La., Kirtland, OH (US) 44060

( * ) Notice: Subject to any disclaimer, the term of this patent is extended or adjusted under 35 U.S.C. 154(b) by 474 days.

(21) Appl. No.: 10/931,671

(22) Filed: Sep. 1, 2004

(65) Prior Publication Data

US 2006/0042171 A1     Mar. 2, 2006

(51) Int. Cl.
*B32B 9/00* (2006.01)
(52) U.S. Cl. ............. 428/408; 428/307.7; 428/312.2; 428/312.6; 428/698; 428/704
(58) Field of Classification Search ............. 428/307.7, 428/312.2, 312.6, 408, 698, 704
See application file for complete search history.

(56) References Cited

U.S. PATENT DOCUMENTS

| | | | |
|---|---|---|---|
| 4,016,736 A | | 4/1977 | Carrison et al. |
| 4,171,339 A | * | 10/1979 | Lee et al. ............. 51/309 |
| 4,224,380 A | | 9/1980 | Bovenkerk et al. |
| 4,242,106 A | * | 12/1980 | Morelock ............. 51/307 |
| 4,288,248 A | | 9/1981 | Bovenkerk et al. |
| 4,518,659 A | | 5/1985 | Gigl et al. |
| 4,534,773 A | | 8/1985 | Phaäl et al. |
| 4,572,722 A | | 2/1986 | Dyer |
| 4,636,253 A | | 1/1987 | Nakai et al. |
| 4,664,705 A | | 5/1987 | Horton et al. |

(Continued)

FOREIGN PATENT DOCUMENTS

EP    0374424 A1    6/1990

OTHER PUBLICATIONS

Robert Radtke, Ricahrd Riedel and John Hanaway, Faster Drill, Longer Life Thermally Stable Diamond Drill Bit Cutter, Gastips Summer 2004.

(Continued)

*Primary Examiner*—Archene Turner
(74) *Attorney, Agent, or Firm*—Bruce A. Jagger (57) ABSTRACT

A superabrasive fracture resistant compact is formed by depositing successive layers of ceramic throughout the network of open pores in a thermally stable self-bonded polycrystalline diamond or cubic boron nitride preform. The void volume in the preform is from approximately 2 to 10 percent of the volume of the preform, and the average pore size is below approximately 3000 nanometers. The preform is evacuated and infiltrated under at least about 1500 pounds per square inch pressure with a liquid pre-ceramic polymerizable precursor. The precursor is infiltrated into the preform at or below the boiling point of the precursor. The precursor is polymerized into a solid phase material. The excess is removed from the outside of the preform, and the polymer is pyrolized to form a ceramic. The process is repeated at least once more so as to achieve upwards of 90 percent filling of the original void volume. When the remaining void volume drops below about 1 percent the physical properties of the compact, such as fracture resistance, improve substantially. Multiple infiltration cycles result in the deposition of sufficient ceramic to reduce the void volume to below 0.5 percent. The fracture resistance of the compacts in which the pores are lined with formed in situ ceramic is generally at least one and one-half times that of the starting preforms.

21 Claims, 2 Drawing Sheets

U.S. PATENT DOCUMENTS

| | | | |
|---|---|---|---|
| 4,770,907 A | 9/1988 | Kimura | |
| 4,793,828 A | 12/1988 | Burnand | |
| 4,798,026 A | 1/1989 | Cerceau | |
| 4,931,363 A | 6/1990 | Slutz et al. | |
| 5,024,680 A | 6/1991 | Chen et al. | |
| 5,086,210 A * | 2/1992 | Nunogaki et al. | 252/513 |
| 5,127,923 A | 7/1992 | Bunting et al. | |
| 5,151,107 A | 9/1992 | Cho et al. | |
| 5,153,295 A | 10/1992 | Whitmarsh et al. | |
| 5,266,236 A | 11/1993 | Bovenkerk | |
| 5,328,976 A | 7/1994 | Leung et al. | |
| 5,437,825 A | 8/1995 | Jensen | |
| 5,445,887 A | 8/1995 | Casti | |
| 5,527,747 A | 6/1996 | Lackey, Jr. et al. | |
| 5,629,249 A | 5/1997 | Leung | |
| 5,633,088 A | 5/1997 | Pinneo | |
| 5,635,250 A | 6/1997 | Blum et al. | |
| 5,705,758 A | 1/1998 | Wakabayashi et al. | |
| 5,755,299 A | 5/1998 | Langford, Jr. et al. | |
| 5,855,642 A | 1/1999 | Miller et al. | |
| 5,884,688 A | 3/1999 | Hinton et al. | |
| 5,912,217 A | 6/1999 | Sumiya et al. | |
| 6,098,731 A | 8/2000 | Chow et al. | |
| 6,138,779 A | 10/2000 | Boyce | |
| 6,238,280 B1 | 5/2001 | Ritt et al. | |
| 6,344,149 B1 | 2/2002 | Oles | |
| 6,447,852 B1 * | 9/2002 | Gordeev et al. | 75/748 |
| 6,730,802 B2 | 5/2004 | Shen et al. | |
| 6,749,931 B1 * | 6/2004 | Pinneo et al. | 428/312.2 |
| 6,797,326 B2 | 9/2004 | Griffin et al. | |
| 2007/0092727 A1 | 4/2007 | Kosters et al. | |

OTHER PUBLICATIONS

Robert Radtke, New High Strength and Faster Drilling Thermally Stable Ploycrystalline Dianomd Cutters For Drill Bits, SPE Paper No. 74515, 2002.

Kion Corporation, TB2 Kion Ceraset, Ceramic Precusor Applications, Kion Corporation Bulletins, www.ceraset.com/bulletins/ceramic.html, Aug. 23, 2004.

Kion Corporation, Ceraset Polyureasilazane Product Data Sheet, Jan. 19, 2001.

Starfile Systems, Pre-ceramic Polymer, www.starfiresystems.com Feb. 15, 2003.

Wans, E. ; Apple, T; Gill, WN, Thermal redistribution reactions of blackglas ceramic, Journal of Applied Polymer Science (USA) vol. 81, No. 1, pp. 143-152. Jul. 2001.

Allied Signal, Material Safety Data Sheet, Blackglas 493A Monomer Solution Jul. 15, 1997.

* cited by examiner

CERAMIC IMPREGNATED SUPERABRASIVES

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Program/Project Identification No. DE-FC276-97FT34368 awarded by National Energy Technology Laboratory, Morgantown, W. Va.

BACKGROUND OF THE INVENTION

1. Field of the Invention

The invention relates in general to superabrasive compacts, and, in particular, to compatible ceramic filled porous high temperature monolithic materials, such as, for example, self-bonded polycrystalline diamond or cubic boron nitride, which have improved fracture resistance and mechanical strength. The pores of a self-bonded preform are lined with multiple layers of ceramic deposited throughout the preform by successive cycles of liquid pre-ceramic impregnation-cure-pyrolysis. The layers may or may not be distinct from one another in the finished superabrasive compact. The layers may or may not have the same properties.

2. Description of the Prior Art

It is well recognized that sintered diamond and cubic boron nitride compacts, wherein the self-bonded particles are formed into a porous monolith, are superabrasives. Typically, the self-bonded compacts have a network of connected pores that extend throughout the compact. As formed this network of pores is typically filed with some material, such as cobalt, that was used to aid in the formation of the self-bonded compact. Removal of this material leaves a compact with an open network of pores extending generally throughout the compact and the superabrasive particles bonded to one another. The empty porosity reduces the strength and the density, but increases the thermal stability from about 700 to 1200 degrees centigrade. Numerous proposals had been made to apply one or more ceramic or metal coatings to diamond particles and consolidate these into abrasive compacts. See, for example, Boyce U.S. Pat. No. 6,138,779, Ritt et al. U.S. Pat. No. 6,238,280, and Chen et al. U.S. Pat. No. 5,024,680. In these proposed abrasive compacts the superabrasive particles were not self-bonded. The superabrasive particles were bonded to one another through some other matrix material.

Currently, diamond and cubic boron nitride are the only known superabrasive materials. Such superabrasive compacts are highly desired for their ability to cut or abrade very hard materials. Superabrasive compacts find application in the mining and drilling industries where hard rock is being cut, as well as in the machining industries. See, for example, Boyce U.S. Pat. No. 6,138,779. It is also generally recognized that it would be very desirable to have superabrasive compacts that exhibit a combination of properties such as high heat resistance, high fracture resistance (toughness), and low wear rates. Numerous generally unsuccessful attempts had previously been made to achieve such a combination of properties. Typically, such previous attempts resulted in achieving to some limited degree one or two of these properties at the expense of the others. Fracture resistance is an important parameter for the performance of diamond cutters when drilling, for example, hard rock.

Durability is generally considered to be the ability of a cutting tool to retain its original sharpness. As a cutting tool becomes dull the rate at which it cuts decreases substantially. For rock drilling applications at substantial depths the cutting rate is very important, often more so than the length of the life of the tool. The durability of monolithic diamond compacts composed of direct bonded diamond particles with cobalt inclusions (PCD), formed under high pressures and temperatures, for example, from diamond grit and a cobalt sintering aid-binder, exhibit low heat resistance, which adversely affects the durability. The cobalt has a much higher coefficient of thermal expansion than the diamond and dissolves the diamond at elevated temperatures above approximately 700 degrees centigrade. Because of the mismatched thermal expansion rates, cobalt containing polycrystalline diamond compacts tend to microcrack, and otherwise loose structural integrity, at the elevated temperatures that are frequently encountered in drilling hard rock at commercially acceptable rates. When the cobalt is leached out, the resulting reticulated porous compact, sometimes described as a thermally stable polycrystalline diamond (TSP) compact, exhibits high heat resistance but low fracture resistance. The low fracture resistance adversely affects the durability of the compact.

The use, for example, of silicon carbide as the sintering binder in a diamond compact results in a compact with generally low fracture strength and wear resistance because of the limited direct binding of the diamond grains with each other. The use of a carbonate as the sintering binder also results in a compact with low fracture resistance. See, for example, Sumiya et al. U.S. Pat. No. 5,912,217.

Typical thermally stable polycrystalline diamond (TSP) compacts generally have a porosity wherein the pores have a high aspect ratio with a diameter of less than about 3, and generally less than about 1 micron, and a void volume of from approximately 10 to 2 percent. The pores are typically in the form of a reticulated network distributed throughout the TSP. It had been previously proposed to apply chemical vapor deposition procedures to deposit diamond in the pores of TSP compacts. See Pinneo U.S. Pat. No. 5,633,088. Chemical vapor deposition procedures generally do not produce satisfactory deposits where the average pore sizes are less than about 25 microns.

Bovenkerk at al. U.S. Pat. No. 4,224,380 proposed the formation of diamond or cubic boron nitride compacts wherein a mass of abrasive particles was sintered with a sintering aid under high temperature and pressure to form an abrasive compact in which the abrasive particles were self-bonded, and the sintering aid was infiltrated throughout the reticulated porosity of the compact. Removal of the infiltrant was accomplished by acid leaching. The resulting porous TSP compact resisted thermal degradation at high temperatures. As noted by Sumiya et al. U.S. Pat. No. 5,912,217, the resulting porous compacts are well known to have low strength and fracture resistance, and, as noted by Horton et al. U.S. Pat. No. 4,664,705, they are also known to oxidize rapidly at high temperatures. When silicon carbide is used as the sintering aid in the formation of polycrystalline diamond compacts the resulting compact exhibits excellent heat resistance but low strength and wear resistance because the binding of the diamond grains to one another is decreased. See Sumiya et al. U.S. Pat. No. 5,912,217. When silicon is used as the sintering aid in forming the polycrystalline diamond compact, the silicon reacts with the diamond and is converted to silicon carbide. The sintering process generally stalls before it is completed. The resulting compact has relatively poor wear characteristics. See Bunting et al. U.S. Pat. No. 5,127,923. Even when the sintering aid was leached from the resulting compact a certain amount of the sintering aid (0.05 to 3 volume percent) had typically remained in the compact. See Phaal et al. U.S. Pat. No. 4,534,773.

Horton et al. U.S. Pat. No. 4,664,705 proposed at least partially infiltrating, under heat and pressure (45-55 Kbars and above 1,000 degrees centigrade), previously formed self-bonded porous diamond compacts with a molten silicon containing alloy such as Ni—Si, Al—Si, or Cu—Si. Horton et al. suggested that because silicon alloys have coefficients of thermal expansion that are close to that of diamond, the at least partially infiltrated compact can withstand temperatures up to about 1200 degrees centigrade without cracking. Horton et al. also states the belief that the silicon in this system does not catalyze the conversion of diamond to graphite, and theorized that this contributed to the thermal stability of a silicon alloy infiltrated diamond compact. Horton et al. did not recognize that even the conversion of a small amount of diamond to silicon carbide or graphite seriously reduces the fracture toughness of the compact. From a consideration of the weight gain due to infiltrant (5-25 weight percent infiltrant), the known densities of the various materials, and the typical void volumes of polycrystalline diamond compacts (approximately 2 to 35 percent void volume), it appears that Horton et al. used very porous preforms in his examples and achieved considerably less than complete filling of the voids in the compact. It appears unlikely that Horton et al's. infiltrant penetrated uniformly throughout the preform. The typical resulting partially infiltrated compact would exhibit considerably less toughness than a substantially fully impregnated compact.

It is known that diamond adheres well to suicides such as $Mo_5Si_3$, $Fe_2Si$, $CoSi$, $Co_2Si$, $Ni_2Si$ and $Fe_3Si$, and that a small amount of molybdenum carbide is formed when $Mo_5Si_3$ is used. See Casti U.S. Pat. No. 5,445,887. Casti did not recognize that $Mo_5Si_3C$, where the $Mo_5Si_3$ is saturated with carbon so that it does not attack the diamond, is chemically inert to diamond up to at least 2000 degrees centigrade.

A wide variety of pyrolyzable liquid polymeric materials had been proposed for use as ceramic precursors. Such materials include, for example, polysilazanes, polyureasilazanes, polythioureasilazanes, polycarbosilanes, polysilanes, polysiloxanes, siloxazanes, silsesquioxanes, silylated silicate resins, and the like. The inclusion of various organometallics in liquid ceramic precursors that yield metal silicates or silicides upon pyrolysis had been proposed. Typically, liquid ceramic precursors are cured to form a solid, which is then pyrolyzed to a ceramic form by heating at a rate of, for example, 200 degrees centigrade per hour to a final temperature of between approximately 300 and 900 degrees centigrade. The volume of the resulting ceramic, after pyrolysis, is typically from 20 to 80 percent by volume of the uncured liquid ceramic precursor. Conducting the pyrolysis operation in oxygen generally results primarily in the formation of silicon oxide related ceramics; in nitrogen, primarily the formation of silicon nitride related ceramics; and, in an inert atmosphere or vacuum, primarily the formation of silicon carbide or silicon oxycarbide ceramics. The inclusion of metals in the precursor results in the formation of ceramics that contain both silicon and the included metal.

The use of various liquid pre-ceramic infiltrants to infiltrate carbon-carbon preforms is known. The pore sizes in such preforms are generally at least approximately 10 microns or more in size.

Thermally stable polycrystalline diamond and cubic boron nitride preforms are known. The individual grains in such preforms can be doped with other materials, if desired. Diamond crystals have, for example, been doped with boron, and the like. Cubic boron nitride can also be doped with other materials, if desired. References herein to polycrystalline diamond or cubic boron nitride compacts, unless otherwise indicated, include compacts made from particles that contain such dopants. Dense superabrasive preforms that have a reticulated porosity of from about 2 to 10, preferably about 2 to 5 percent void volume, and an average pore size of from approximately 5 to 3,000 nanometers (approximately 0.005 to 3 microns) are also known. Such dense superabrasive preforms had generally been used for wear purposes rather than cutting applications. It had been generally assumed that fine structured diamond compacts acted like a large single crystal and were prone to crack propagation and catastrophic failure. It was also recognized that fine structured diamond-diamond compacts were difficult to infiltrate. See Cho et al. U.S. Pat. No. 5,151,107. Densification of diamond-diamond compacts containing less than about 3 volume percent void volume with average pore sizes of less than about 1,000 nanometers was generally considered to be impractical or impossible.

These and other difficulties of the prior art have been overcome according to the present invention.

BRIEF SUMMARY OF THE INVENTION

A preferred embodiment of the superabrasive compacts according to the present invention comprises a ceramic impregnated thermally stable polycrystalline diamond or cubic boron nitride compact. The compacts exhibit substantial direct particle to particle bonding with an open network of porosity between the bonded grains. Ceramic impregnant is deposited successively in several layers throughout the compact. The successive layers or pore linings can be formed of the same or different ceramic material, and formed under the same or different conditions. When densification is complete, the pore linings may or may not be visible as separate layers. Whether the separate layers are visible depends on the nature of the linings and the history of their formation. The deposited ceramic material lines the pore system within the superabrasive compact and thus substantially fully densifies the preform with ceramic material that is generally thermally and chemically compatible with the diamond. The first layer of the pore lining should preferably be relatively soft so as to improve fracture strength. It is necessary that the first layer be substantially non-reactive up to at least approximately 1200 degrees centigrade with the material of which the preform is composed. The porous preform from which the compact is made has a reticulated void volume of from about 2 to 10, preferably from about 2 to 5 percent or less. Preferably, there is substantially no blind porosity in the preform. That is, all of the pores open, directly, or indirectly, to the outside of the preform. Substantially no cobalt, for example, is trapped in the interstices of the compact. The reticulated void volume is generally in the form of an open network dispersed throughout the preform wherein the pores have an average size of less than approximately 3,000, preferably less than approximately 1,000 nanometers. The ceramic impregnant generally occupies at least about 50, preferably 70, and more preferably at least about 90 percent of the void volume after densification is complete. The void volume in the densified compact is generally less than about 0.5, and, preferably less than about 0.3 percent. At void volumes of less than about 1.0 percent, the physical properties of the compact improve non-linearly as the degree of densification increases. For example, an increase in densification of from about 0.5 to 0.3 volume percent, produces much more than a 0.2 percent increase in durability.

The superabrasive materials to which the present invention is particularly applicable generally have a hardness of greater than approximately 4,000 kilograms per square millimeter as measured by a Knoop hardness test. After densification according to the present invention the ceramic impregnated superabrasive compacts should have an impact strength which is at least one and one half to two times that of the undensified preform as measured by a drop weight impact method.

Superabrasive ceramic impregnated compacts are generally formed according to the present invention by subjecting a superabrasive thermally stable preform to a vacuum to evacuate the gases from the network of pores. The preform is immersed in the liquid impregnant, and evacuation is preferably conducted at temperatures and pressures just below or at the boiling point of the liquid pre-ceramic impregnant. The evacuation is followed by liquid impregnation at pressures above approximately 1,500, preferably 1,800, and more preferably 2,000 to 3,000 or more pounds per square inch. Pressure is preferably applied by means of an inert gas. Where preforms with more than approximately 10 percent void volume are used, the impregnation pressure tends to crack the preform. There is some risk of cracking at void volumes of more than approximately 7 percent. Where the average pore size is larger than about 3,000 nanometers (as determined by the mercury pore symmetry method) the durability of the resulting compact tends to diminish. The average pore size is preferably less than approximately 1,000 nanometers.

Liquid impregnation, particularly above approximately 2,000 to 2,500 pounds per square inch appears to result in substantially complete pore filling with the liquid impregnant when the average pore size is from approximately 1,000 to 100 nanometers. Efficient processing requires that the liquid pre-ceramic fill at least 70 and preferably 90 to 100 percent of the available void volume in each cycle. As the liquid pre-ceramic impregnant is cured and then thermally reduced (pyrolized) to a ceramic its volume typically shrinks by from approximately 20 to 80 percent. The first cycle of impregnation-curing-firing typically leaves some significant void volume in the ceramic impregnated preform. The formed in situ ceramic thus forms a pore lining where the average size of the pores is reduced, but most of the pores are not fully blocked.

In general, the formed in situ cured pre-ceramic also forms a coating or deposit on the exterior surfaces of the preform, which deposit substantially blocks or seals the exterior openings of the reticulated network of pores. Preferably, this deposit or coating is removed from the exterior surfaces of the preform by acid, grinding, polishing, or otherwise, before the cured pre-ceramic is heated and fired or pyrolized to convert it to a ceramic.

The liquid impregnation-curing-firing operation is carried out several times with the same or different starting liquid impregnants. With each successive cycle the pores and the remaining void volume become smaller. In general, the benefits realized by carrying out more than three such cycles are minimal. Three such cycles are generally sufficient to reduce the void volume of the compact to below approximately 1 and preferably below approximately 0.5 to 0.3 percent. The small increases in durability and other desirable properties that are typically achieved by further reductions in void volume are sometimes not worth the cost of carrying out the additional cycles. Typically, pressures well above 2,000 pounds per square inch (for example, 2,500 to 5,000 pounds per square inch) are required to effectively impregnate preforms with less than 0.5 percent void volume. If desired, particularly when pore diameters are smaller, i.e. less than 100 nanometers, pressures of as much as 10,000 to 20,000 pounds per square inch can be used to substantially completely fill the pores to a void volume of less than about 0.01 percent.

The liquid pre-ceramic compositions that are suitable for use as impregnants according to the present invention are generally well known to be useful for other purposes, such as impregnating carbon-carbon composites. When used according to the present invention, however, such impregnants are generally selected so that they have a low viscosity at the impregnation temperature, are substantially chemically inert to the material of the preform, and readily wet the surfaces of the preform. Suitable liquid impregnants include for example Blackglas, supplied by Honeywell, and Starfire Matrix Polymer, supplied by Starfire Systems, Inc. Blackglas is a trademark of Honeywell, and Starfire Matrix Polymer is a trademark of Starfire Systems, Inc. The surface tension of the impregnant should be such that it forms a contact angle of more than approximately 90 degrees with a surface of the preform. It is well known that diamond is hard to wet. See Slutz et al. U.S. Pat. No. 4,931,363. The viscosity should be as low as possible, that is, that of water (approximately 1 centipoise), consistent with the chemistry required to create the desired ceramic. Preferably, the viscosity of the liquid impregnant is less than approximately 10, and more preferably, approximately 3 centipoises. The higher the viscosity, the greater the pressure required to impregnate the porosity. Generally the required pressure is proportional to the viscosity. Higher pressures can cause the porous ceramic to fracture.

The ceramic impregnants are selected and applied so that they are thermally, chemically, and mechanically compatible with the superabrasive compact. At least the initial layer of ceramic is substantially chemically inert to the monolithic superabrasive preform at the temperatures of formation and use. To the extent that the ceramic or the ceramic pre-cursor attacks, dissolves, or reacts in some way with the superabrasive material of the preform, the final compact is weakened. This is true even where the attack is relatively minor as with the melt infiltration of thermally stable diamond preforms with silicon-metal alloys. The joinder locations or bridges between individual superabrasive particles are particularly susceptible to weakening because the bridges typically have small cross-sections as compared to the particle size of the particles from which the preform is formed.

The linear coefficient of thermal expansion of the ceramic should be as close as possible to that of the superabrasive preform. Substantial differences in the rates of thermal expansion between the ceramic and the preform will crack the preform. The linear coefficient of thermal expansion of the ceramic pore liner should be within about 30, preferably within about 20, and more preferably within about 15 percent of that of the superabrasive preform in the temperature range of about 20 to 1,000 degrees centigrade.

The mechanical properties of the ceramic pore liner should complement those of the preform. The pore linings are preferably composed of more that one layer. Alternating layers should have significantly different modulus. For example, SiOC ceramic formed from Blackglas has a modulus that is approximately 35 percent of that of SiC ceramic that is formed from Ceraset. Further, SiC has a modulus that is approximately 50 percent of that of TSP diamond or cubic boron nitride. Ceraset is a trademark of KiON Corporation, and is applied to a liquid pre-ceramic polyureasilazane. The modulus of any layer of the pore lining should be at least about 15 percent of that of the superabrasive preform at the temperatures under which the compact will be used. Where the first ceramic layer may have a modulus that is from approximately 15 to 30 percent of the modulus of the superabrasive preform, the modulus of the second layer may be at least about 40 percent of the modulus of the superabrasive preform. It is highly desirable that the ceramic pore liner should act to prevent or substantially retard the propagation of cracks through the preform. Also, the pore liner should serve to reinforce the preform. The ceramic pore lining substantially blocks the pores thus substantially reducing the surface area of the preform. Depending on the character of the ceramic, it may be less reactive than the preform with elements that are generally found in the environment at the situs of use, thus protecting the superabrasive preform from attack by such elements. Certain embodiments include a ceramic impregnated thermally stable polycrystalline diamond or cubic boron nitride compact. This compact comprises a thermally stable polycrystalline diamond or cubic boron nitride preform having an open void volume of from about 2 to 10 percent and substantially no blind void volume. The open void volume being generally in the form of a reticulated network of pores. The reticulated network of pores has walls. More than 95 percent of the pores have a size of less than about 3,000 nanometers. A first amount of energy is required to fracture the preform. A formed in situ ceramic deposit fills at least about 90 percent of the void volume. The ceramic deposit is formed against the walls. The ceramic deposit is effectively undissolved and unreacted with the diamond or cubic boron nitride. Second amount of energy is required to fracture the compact. The second amount of energy is at least approximately one and one half times the first amount of energy. According to further embodiments, a ceramic impregnated superabrasive compact comprises a preform comprised of self-bonded, monolithic, polycrystalline, superabrasive material. The preform has a thermally stable portion extending from a surface thereof to a depth of at least approximately 100 microns below the surface. The thermally stable portion has an open void volume of from about 2 to 10 percent and substantially no blind void volume. The open void volume being generally in the form of a reticulated network of pores. The reticulated network of pores have walls. More than 95 percent of the pores have a size of less than about 3,000 nanometers. A formed in situ ceramic deposit fills at least about 70 percent of the void volume. The ceramic deposit being formed against the walls and being effectively undissolved and unreacted with the superabrasive material. The formed in situ ceramic deposit being caused by infiltrating a pre-existing reticulated network of pores with a liquid pre-ceramic and converting the resulting infiltrated liquid pre-ceramic into the ceramic deposit.

Other objects, advantages, and novel features of the present invention will become apparent from the following detailed description of the invention when considered in conjunction with the accompanying drawings.

BRIEF DESCRIPTION OF THE DRAWINGS

The present invention provides its benefits across a broad spectrum of ceramic impregnated superabrasive compacts. While the description which follows hereinafter is meant to be representative of a number of such applications, it is not exhaustive. As those skilled in the art will recognize, the basic methods and apparatus taught herein can be readily adapted to many uses. It is applicant's intent that this specification and the claims appended hereto be accorded a breadth in keeping with the scope and spirit of the invention being disclosed despite what might appear to be limiting language imposed by the requirements of referring to the specific examples disclosed.

Referring particularly to the drawings for the purposes of illustration only and not limitation.

DETAILED DESCRIPTION OF THE PREFERRED EMBODIMENTS

Figures 1, 2, 3, 4:
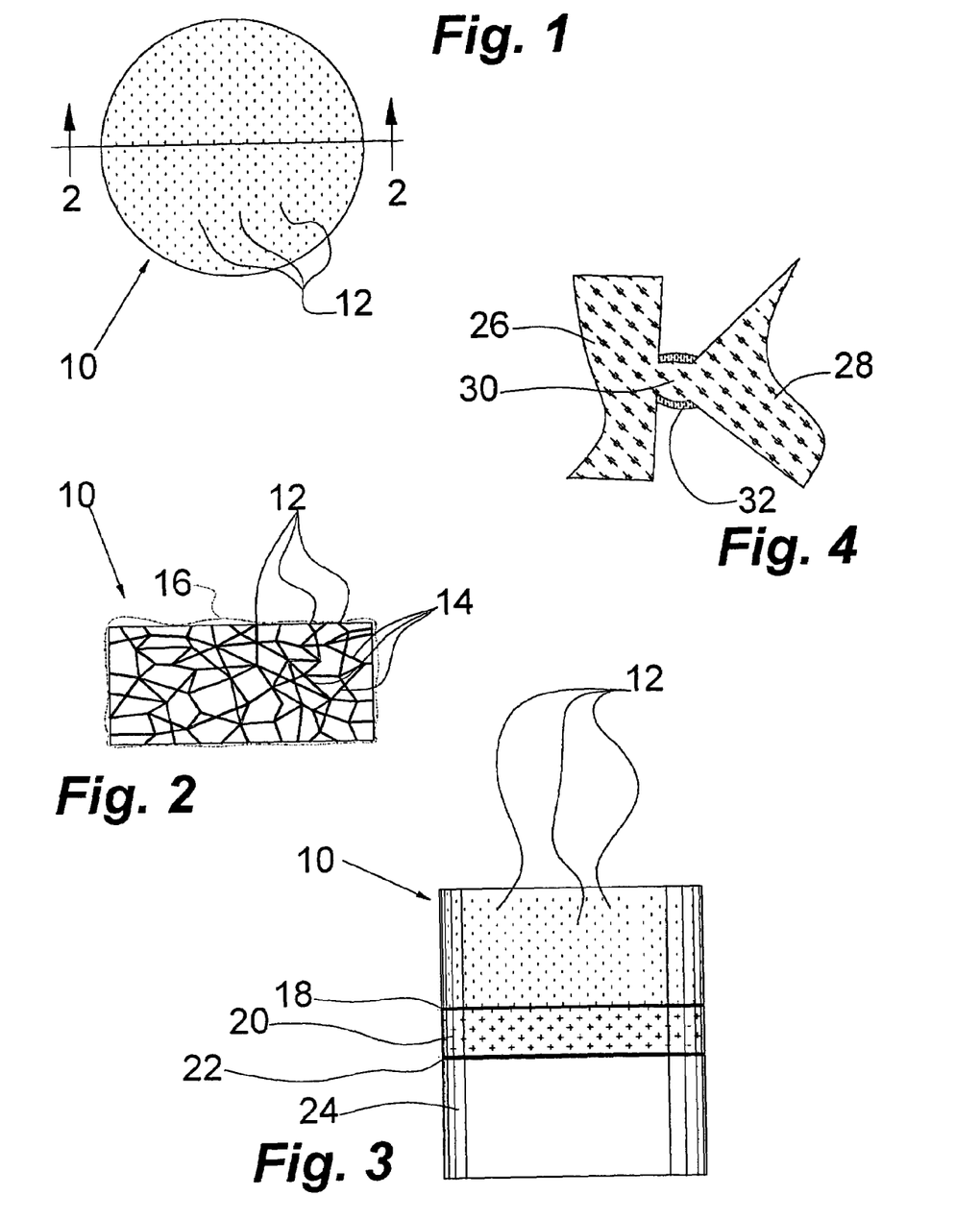
FIG. 1 is a diagrammatic plan view of a preferred embodiment of a ceramic impregnated superabrasive compact according to the present invention.
FIG. 2 is a diagrammatic cross-sectional view taken along line 2-2 in FIG. 1.
FIG. 3 is a diagrammatic elevational view of a ceramic impregnated superabrasive compact mounted to a substrate.
FIG. 4 is a diagrammatic cross-sectional representation of a particle-to-particle bond in a self-bonded monolithic porous superabrasive preform.

Referring now to the drawings wherein like reference numerals designate identical or corresponding parts throughout the several views, there is illustrated generally at 10 a ceramic impregnated polycrystalline superabrasive compact. The pores within the compact occur in a generally evenly distributed reticulated network 14 that is open to the environment at openings of which 12 are typical. In use, the ceramic impregnated superabrasive compacts 10 are brazed or otherwise bonded at 20 to a substrate 24, such as, for example, tungsten carbide mounting member 24. The thickness of the bond 20 has been exaggerated for the purposes of illustration. Bond 20 is generally much thinner than is illustrated. The braze or other bonding adheres well at 18 to the impregnated preform, and at 22 to the mounting member 24. Both bonds 18 and 22 must be secure or the attachment will fail.

Self bonded monolithic polycrystalline superabrasive preforms are typically bonded at a crystalline point to the face of an adjacent crystal. With particular reference to FIG. 4 there is diagrammatically illustrated a superabrasive crystal 26 that is bonded by a bridge 30 to an adjacent superabrasive crystal 28. The strength of the bridge 30 and of the overall polycrystalline compact is enhanced when the cross-sectional size of the bridge is enlarged. Where part of the bridge is either dissolved during impregnation or poorly formed, the cross-sectional size of the bridge 30 is reduced, for example, by the amount of the material indicated at 32. During impregnation and curing of the preform, a layer 16 (FIG. 2) of cured pre-ceramic polymer forms on the outside of the preform. This layer seals the openings to the reticulated porosity within the preform. Layer 16 should be removed before the pre-ceramic polymer is fired to produce a ceramic. This opens the pores to further impregnation in subsequent cycles, and allows the venting of gases during pyrolysis.

Figure 5:
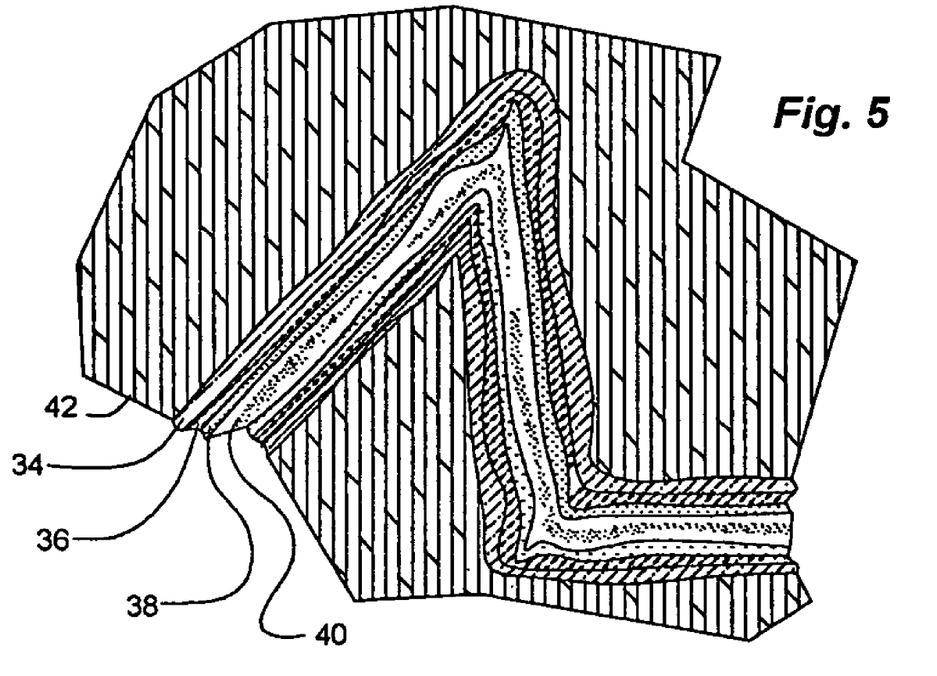
FIG. 5 is a fragmentary diagrammatic cross-sectional representation of a pore lined with three layers of ceramic.

A single lined pore is illustrated in FIG. 5. A pore in a superabrasive preform 42 is lined with three layers of ceramic, 34, 36, and 38, respectively. The pore still has some void volume as indicated at 40. The layers 34, 36, and 38 can be the same or different in composition, and they can be formed under the same or different conditions. Although the layers are shown, for purposes of illustration, with sharp visible lines of separation, there may in fact be no visible lines of separation, or they may be indistinct, depending on composition and processing parameters. Differences in either composition or processing parameters may result in the layers having different characteristics. The layers typically are not as distinct as shown in FIG. 5. As illustrated, the layers are composed of amorphous ceramics. If pyrolysis is carried to the stage where crystalline ceramics are formed (up to approximately 1,200 degrees centigrade or more), the appearance of the liner changes substantially. When the layers differ from one another in their properties, they preferably have different modulus. It is known that shock waves (stress waves) are deflected at the interface between layers of different modulus. This prevents shock waves from propagating through the compact and protects the compact from damage. Thus, when compared to the use of a single composition impregnant, the impregnated material fracture resistance is increased and, accordingly, the energy necessary to fracture the material is increased significantly. In application, an abrasive article can thus be improved to maintain a sharp edge to provide greater performance. Where, for example, layer 34 is composed of silicon oxy-carbide, which has a modulus about 15 percent of TSP diamond, it is desirable that layer 36 be silicon carbide, which has a modulus about 50 percent of that of TSP diamond. Amorphous glass silicon oxy-carbide is soft as compared to silicon carbide. Preferably, the soft silicon oxy-carbide layer is deposited first on the walls of the pores in the preform, followed by a relatively harder deposit of ceramic.

In a preferred embodiment, which has been selected for purposes of illustration only and not limitation, a porous polycrystalline diamond preform was impregnated by a liquid impregnation process to produce a ceramic filled polycrystalline diamond compact. The preform, according to known procedures, was prepared from 40 mesh diamond grit. The diamond grit was sintered and impregnated with molten cobalt and self-bonded under heat and pressure. The cobalt was then removed by acid leaching. The resulting self-bonded thermally stable diamond preform had a network of pores that was open to the exterior of the preform. There were substantially no blind pores, so there was substantially no cobalt left in the preform after leaching. The pore sizes ranged from approximately 5 to 3,000 nanometers with about one-third of the pores averaging from 5 to 100 nanometers, and two-thirds ranging from 100 to 3,000 nanometers. More than about 95 percent of the pores were below approximately 1,000 nanometers in size. The preform had a void volume of about 3 percent. The preform had a cylindrical form with a diameter of about 8 millimeters, and a thickness of about 2.87 millimeters.

The selected liquid impregnant was a siloxane monomer with a molecular weight between about 200 and 3,000 identified by the trademark Blackglas 493A. The liquid impregnant was catalyzed by the addition of Blackglas 493B catalyst solution. This liquid impregnant was selected because it wet the walls of the preform and adhered well to them.

About 50 substantially identical cylindrical preforms were placed in an autoclave. The preforms were fully immersed in the liquid impregnant. The pressure was reduced to about 250 milli-Torr vacuum pressure and held there for about 2 hours at ambient temperature. The pressure was maintained at or just slightly above the boiling point of the liquid impregnant. This removed the gasses from the network of pores in the preforms.

Helium gas was then introduced into the autoclave and the pressure was raised to about 2,200 pounds per square inch. The pressure was held at about 2,200 pounds per square inch for about 12 minutes to accomplish impregnation of the networks of open pores in the preforms.

The pressure was brought to ambient and the excess impregnant was drained away. The preforms were heated in an inert atmosphere at a rate of about 1 degree centigrade per minute to a temperature of about 100 degrees centigrade where it was held for about 12 hours to complete curing of the liquid impregnant to a solid. The preforms were then cooled in an inert atmosphere at a rate of about 3 to 5 degrees centigrade to below about 50 degrees centigrade.

Excess cured impregnant was removed from the surfaces of the preforms by wiping them with 240 grit silicon carbide sandpaper. The cured preforms were placed in a furnace and heated in an inert atmosphere at a rate of about 2 degrees centigrade per minute to a temperature of about 400 degrees centigrade where they were held for about 30 minutes. The preforms were then heated in an inert atmosphere at a rate of about 1 degree centigrade per minute to a temperature of about 600 degrees centigrade where they were held for about 60 minutes. Finally, the preforms were heated in an inert atmosphere at a rate of about 2 degrees centigrade per minute to a temperature of about 850 degrees centigrade where they were held for about 60 minutes to complete the desired degree of pyrolysis.

The preforms were allowed to cool to room temperature in an inert atmosphere at the rate of about 5 degrees centigrade per minute. The volume of the pyrolized ceramic impregnant was approximately 85 percent that of the liquid impregnant, so there was some void volume left in the preforms.

The impregnation-cure-pyrolysis steps were repeated as described 6 times more. Following the final pyrolysis step, the preforms were heated under a continuous purge of argon or helium at a rate of about 2 degrees centigrade per minute to a temperature of about 1,100 degrees centigrade and held there for at least 60 minutes. The ceramic filled preforms were then cooled at a rate of about 5 degrees centigrade per minute in an inert atmosphere to a temperature of about 100 degrees centigrade whereupon the ceramic filled compacts were removed from the furnace and allowed to air cool. It was found that the ceramic filled compacts had a void volume of less than approximately 0.25 percent after 3 cycles, and were suitable for brazing on tungsten carbide substrates at brazing temperatures of about 1,000 degrees centigrade. Therefore, for process efficiency, the number of cycles should generally be limited to 3. Void volume was determined by weighing the compacts before and after infiltration, and determining the amount of ceramic infiltrant deposited in the pores in the preform by the weight gain. From this, the void volume was calculated. For purposes of stability, the final formation temperature should be at least 100 degrees centigrade above the highest temperature that the compact will subsequently encounter. In general, there were no visible sharp demarcation lines between the layers in the pore liner after the final heating step.

A final pyrolysis temperature of 1,100 degrees centigrade produces an amorphous silicon oxy-carbide ceramic. Carrying the final temperature to above approximately 1,400 degrees centigrade produces a crystalline silicon carbide, but the conditions must be such as to prevent the diamond from converting to graphite. It is well known in the art that this could be performed in a high temperature high pressure press like the ones used to manufacture man-made diamond grit, polycrystalline diamond compacts, and cubic boron nitride. The melting point of the ceramic pore liner, in contrast to those of melt infiltrated silicon-metal alloys, is substantially above any temperature that the compact will encounter in use.

Repeating the above described procedure using a cylindrical preform having a diameter of 13.7 millimeters and a thickness of 3.56 millimeters produced comparable results.

Repeating the above described procedure using Starfire Matrix Polymer, an allyl-hydridopolycarbosilane, resulted in the formation of an amorphous silicon carbide ceramic. Curing was accomplished by heating under a slow flow of inert gas from room temperature to about 100 degrees centigrade at a rate of one degree centigrade per minute. The temperature was held at about 100 degrees centigrade for about 30 minutes. The temperature was then raised at the same rate to about 250 degrees centigrade where it was held for about one hour. The temperature was subsequently raised at the same rate to about 300 degrees and held for one about hour, and then to about 400 degrees centigrade where it was held for about one hour. The temperature was then lowered to about 100 degrees centigrade at a rate of no more than 5 degrees per minute. Pyrolysis of Starfire Matrix polymer at about 1,100 degrees centigrade produces an amorphous silicon carbide ceramic. Carrying the final temperature to above approximately 1,400 degrees centigrade produces a crystalline silicon carbide, but the conditions must be such as to prevent the diamond from converting to graphite. It is well known in the art that this could be performed in a high temperature high pressure press like the ones used to manufacture man-made diamond grit, polycrystalline diamond compacts, and cubic boron nitride.

Repeating the above procedure using a silicon oxy-carbide former as the first layer, and a silicon carbide former as the second and third layers results in a very fracture resistant compact.

Repeating the above procedure using molybdenum containing liquid polysilane precursor provides a $Mo_5Si_3C$ ceramic as the impregnant or pore lining in a thermally stable diamond preform. The $Mo_5Si_3C$ ceramic is completely chemically inert to the diamond up to about 2,000 degrees centigrade. It also adheres well to diamond. This substantially increases the utility of the resulting compact in high temperature applications. Repeating the above procedure so as to produce a pore lining in which the first layer of ceramic is $Mo_5Si_3C$, and the second is SiC produces a very crack resistant superabrasive compact that is suitable for use up to operating temperatures of about 1200 degrees centigrade.

Repeating the above procedure using a preform prepared from 25 mesh diamond grit that has a void volume of approximately 2 percent, and with small pore sizes (more than 90 percent below about 800 nanometers) generally requires higher impregnation pressures of at least approximately 3,000 to 5,000 pounds per square inch to fill 90 percent or more of the void volume with ceramic. In general, as the average pore size decreases with successive cycles, increasing the pressure in the impregnation step results in more complete filing of the remaining void volume. To accomplish substantially complete filling of all void volume, pressures as high as 20,000 pounds per square inch with processing times of several hours are generally required. In general, as the average pore size in the preform decrease, the pressure required to accomplish impregnation increases. Gas pressure is preferred however pressure can be applied by other means, if desired.

The properties of a compact improve substantially as the void volume decreases below approximately 2 percent. The impact strength of a compact with 2 percent void volume is typically only approximately one-half that of a compact with 0.5 percent void volume. Flexure and compressive strength also improve as the percentage of void volume drops below 1 percent.

The equipment required to accomplish the present invention costs only a small fraction of that of the equipment that is typically used in the production of superabrasives. The high pressure liquid impregnation step can generally be carried out at temperatures of less than approximately 100 degrees centigrade and pressures of less than approximately 5,000 pounds per square inch, so the materials of construction for the equipment are relatively inexpensive. Even when higher pressures of as much as 20,000 pounds per square inch are used, the relatively low temperatures permit the use of relatively inexpensive equipment.

Repeating the above procedure using self-bonded cubic boron nitride as the preform produces comparable results.

Repeating the above procedure using a polycrystalline diamond preform from which the cobalt catalyst has been leached down to depth of only approximately the first 100 to 500 microns below the surface, leaving cobalt catalyst filled pores in the center of the preform, results in the formation of a compact that is resistant to surface fretting. The processing temperature is limited to less than 900 degrees centigrade, and the maximum temperature of use is about 700 degrees centigrade. Other preforms with partially leached preform forming catalysts produce comparable results when the surface pores are lined with ceramic deposits according to the present invention.

Repeating the above procedure using an atmosphere of nitrogen in the pyrolysis step results in the formation of a silicon oxy-nitride ceramic.

In general, the first layer is formed into a ceramic before a second layer is applied although under certain conditions it is possible to carry out two or more impregnation and curing cycles before carrying out a pyrolysis step.

The impact resistance of conventional TSP diamond with a void volume of about 3 percent was compared to the impact resistance of TSP diamond with about the same void volume in which the porosity had been filled with an amorphous silicon oxy-carbide ceramic deposited in three cycles of impregnation-curing-pyrolysis as described above. The ceramic filled TSP diamond had a void volume of approximately 0.5 percent. An Instron Instrumented Impact Test Machine was used to measure the impact energy required to plunge a 0.037 inch (0.95 millimeter) diameter round end diamond striker through the center of 0.539 inch (13.7 millimeter) diameter TSP discs. The TSP discs had a thickness of about 0.138 inches (3.5 millimeters). The discs were supported circumferentially over a hole in a steel test block. With a selected mass above the striker, the impact device was released. As the striker passed through a light gate, its velocity was accurately measured. A piezoelectric sensor positioned above the striker measured the vertical force. A graph of force versus time was then prepared. The impact energy required to fracture the sample was also calculated as the integral of the area under the curve up to the point of failure. The measurements and results are set forth in Table 1 below.

TABLE 1

| Parameters | TSP diamond, 3 percent void volume (unfilled) | TSP diamond, 3 percent void volume filled with ceramic (densified) |
|---|---|---|
| Impact Velocity (feet per second) | 2.43 | 2.43 |
| Maximum Load To Fracture (pounds) | 173.08 | 215.16 |
| Energy To Maximum Load (foot-pounds) | 0.0137 | 0.0290 |
| Total Energy (foot-pounds) | 0.0220 | 0.0332 |

As is apparent from the above test results, it required more than twice as much energy to fracture the ceramic filled TSP diamond (0.0137 versus 0.0290 foot-pounds). The energy required to fracture ceramic filled superabrasive compacts of the present invention is generally at least approximately one and one half, and preferably at least approximately two times the energy required to fracture the equivalent unfilled superabrasive preforms.

Drilling tests were conducted to determine the comparative propensity of conventional TSP diamond with a void volume of about 3 percent to form microcracks and fail as compared to TSP diamond with about the same void volume in which the porosity had been filled (densified) with an amorphous silicon oxy-carbide ceramic deposited in three cycles of impregnation-curing-pyrolysis as described above. The ceramic filled TSP diamond had a void volume of about 0.5 percent. At ambient pressure, a 3 by 3 by 3 foot (91 cm×91 cm×91 cm) Sierra White Granite block was drilled at about 30 feet (9.14 meters) per hour with varying bit weight and about 100 revolutions per minute applied to a 3.25-inch (8.255 cm) core bit. The core bit had three cylindrical, approximately 0.5 inch (12.7 millimeter) diameter, about 0.138 inch (3.5 millimeter) thick cutters brazed to tungsten carbide substrates. The densified TSP test cutter was located in the center. Outside and inside cutters were replaced periodically with unworn cutters to maintain bit balance. The TSP cutters were inspected under magnification for any microfracture after drilling each 3-foot (91 cm) hole. At least one of the unfilled TSP diamond cutters typically failed on each hole by reason of halo microfracture, and the resulting flaking off of diamond material. The densified TSP diamond cutters did not fail. It required 25 power magnification to detect this microfracture.

Conventional and densified TSP diamond cutters were tested using a typical standard industry impact test. In this test, cutters were mounted on the rotating head of a horizontal mill. With the cutter rotating at 300 revolutions per minute, an interrupted cut in a 43 centimeter cube of Berre Granite was made with each rotation. During each pass, a 0.75 millimeter layer of rock was removed from the surface of the rock. The untreated TSP cutter had a microcrack after the removal of the first layer of rock. Densified TSP diamond cutters removed 15 layers of granite with no microfracture before the test was terminated.

Densified diamond cutters were tested by placing them in an 8.5 inch diameter drill bit. Deep drilling of Trout Creek Sandstone (a very hard and abrasive rock) was performed with a pressure of 50,000 pounds per square inch (a simulate depth of 15,000 feet). No microfracture was observed.

The results of these tests indicate that densified TSP diamond compacts according to the present invention are both strong and tough. Down-hole drill bits using these compacts of the present invention are durable, that is, they will stay sharp longer than comparable undensified cutters. Sharpness generally determines cutting rate. Maintaining sharpness is more important to efficient drilling operations than tool life.

What have been described are preferred embodiments in which modifications and changes may be made without departing from the spirit and scope of the accompanying claims. Clearly, many modifications and variations of the present invention are possible in light of the above teachings. It is therefore to be understood that, within the scope of the appended claims, the invention may be practiced otherwise than as specifically described.

What is claimed is:

1. A compact that is ceramic impregnated thermally stable self bonded monolithic polycrystalline diamond or cubic boron nitride comprising:
   a preform, said preform being thermally stable, and composed of self bonded, monolithic, polycrystalline diamond or cubic boron nitride and having an open void volume of from about 2 to 10 percent and substantially no blind void volume, said open void volume being generally in the form of a reticulated network of pores, said reticulated network of pores having walls, wherein more than 95 percent of said pores have a size of less than about 3,000 nanometers, a first amount of energy being required to fracture said preform; and
   a formed in situ ceramic deposit filling at least about 90 percent of said void volume, said ceramic deposit being formed against said walls and being effectively undissolved and unreacted with said diamond or cubic boron nitride, said formed in situ ceramic deposit being caused by infiltrating a pre-existing said reticulated network of pores with a liquid pre-ceramic and converting the resulting infiltrated liquid pre-ceramic into said formed in situ ceramic deposit, a second amount of energy being required to fracture said compact, said second amount of energy being at least approximately one and one half times said first amount of energy.

2. A compact of claim 1 wherein said ceramic deposit includes at least first and second layers of ceramic each of which has a modulus, and the modulus of said first layer is different from the modulus of said second layer, said first layer being formed in situ against said walls and said second layer being formed in situ against said first layer.

3. A compact of claim 1 wherein said ceramic deposit comprises silicon oxycarbide or silicon oxynitride.

4. A compact of claim 1 wherein said ceramic deposit comprises $Mo_5Si_3C$ or silicon carbide.

5. A compact of claim 1 wherein said ceramic deposit includes at least a first layer comprising $Mo_5Si_3C$ ceramic and having a first modulus, and a second layer of ceramic having a different modulus, said first layer being formed in situ against said walls and said second layer being formed in situ against said first layer.

6. A superabrasive compact comprising:
   a superabrasive preform, said superabrasive preform being thermally stable, and composed of self bonded, monolithic, polycrystalline superabrasive material, and having an open void volume of from about 2 to 10 percent and substantially no blind void volume, said open void volume being generally in the form of a reticulated network of pores, said pores have an average size of less than about 1000 nanometers; and
   a formed in situ ceramic deposit filling at least about 90 percent of said void volume, said ceramic deposit lining said reticulated network of pores, and being effectively undissolved and unreacted with said superabrasive material, said formed in situ ceramic deposit being caused by infiltrating a pre-existing said reticulated network of pores with a liquid pre-ceramic and converting the resulting infiltrated liquid pre-ceramic into said formed in situ ceramic deposit, said superabrasive compact having an impact strength greater than approximately one and one half times that of said superabrasive preform as measured by a drop weight impact method, and at least said ceramic deposit in contact with said superabrasive material being substantially chemically inert to said superabrasive material at temperatures up to at least approximately 1200 degrees centigrade.

7. A superabrasive compact of claim 6 wherein said superabrasive preform comprises self bonded monolithic polycrystalline diamond or self bonded monolithic polycrystalline cubic boron nitride.

8. A superabrasive compact of claim 6 wherein said superabrasive preform comprises self bonded monolithic polycrystalline diamond and said ceramic deposit comprises $Mo_5Si_3C$.

9. A superabrasive compact of claim 6 wherein at least said ceramic deposit in contact with said superabrasive material has a coefficient of thermal expansion that is within approximately 30 percent of that of said superabrasive preform measured between about 20 and 1000 degrees centigrade.

10. A superabrasive compact of claim 6 wherein at least said ceramic deposit in contact with said superabrasive material has a coefficient of thermal expansion that is within approximately 20 percent of that of said superabrasive preform measured between about 20 and 1000 degrees centigrade.

11. A superabrasive compact of claim 6 wherein at least said ceramic deposit in contact with said superabrasive material has a coefficient of thermal expansion that is greater than that of said superabrasive preform, and within about 15 percent of that of said superabrasive preform measured between about 20 and 1000 degrees centigrade.

12. A superabrasive compact comprising:
a superabrasive preform, said superabrasive preform being thermally stable and composed of self bonded, monolithic, polycrystalline superabrasive material, and having an open void volume of from about 2 to 10 percent and substantially no blind void volume, said open void volume being generally in the form of a reticulated network of pores, said reticulated network of pores having walls, wherein said reticulated network of pores has an average size of less than about 1000 nanometers, said superabrasive preform having a modulus; and
a formed in situ ceramic deposit filling at least about 70 percent of said void volume, said ceramic deposit substantially lining said reticulated network of pores, and being effectively undissolved and unreacted with said superabrasive material, said formed in situ ceramic deposit being caused by infiltrating a pre-existing said reticulated network of pores with a liquid pre-ceramic and converting the resulting infiltrated liquid pre-ceramic into said formed in situ ceramic deposit, said ceramic deposit comprising at least first and second ceramic layers, said first ceramic layer being formed in situ on said walls and said second ceramic layer being formed in situ on said first layer, said first ceramic layer having a modulus that is from approximately 15 to 30 percent of the modulus of the superabrasive preform, said second layer having a modulus that is at least about 40% of the modulus of the superabrasive preform, at least said first layer being substantially chemically inert to said superabrasive material at temperatures up to at least approximately 1200 degrees centigrade, and said superabrasive compact having an impact strength that is at least approximately one and one-half times that of said superabrasive preform as measured by a drop weight impact method.

13. A superabrasive compact of claim 12 wherein said superabrasive preform comprises self bonded monolithic polycrystalline diamond or self bonded monolithic polycrystalline cubic boron nitride.

14. A superabrasive compact of claim 12 wherein said superabrasive preform comprises self bonded monolithic polycrystalline diamond and at least one of said ceramic layers comprises a silicon containing ceramic.

15. A superabrasive compact of claim 12 wherein at least one of said first and second ceramic layers has a coefficient of thermal expansion that is within 30 percent of that of said superabrasive preform measured between about 20 and 1000 degrees centigrade.

16. A superabrasive compact of claim 12 wherein at least one of said first and second ceramic layers has a coefficient of thermal expansion that is greater than that of said superabrasive preform, and within about 20 percent of that of said superabrasive preform measured between about 20 and 1000 degrees centigrade.

17. A superabrasive compact of claim 12 wherein at least one of said first and second ceramic layers has a coefficient of thermal expansion that is greater than that of said superabrasive preform, and within about 15 percent of that of said superabrasive preform measured between about 20 and 1000 degrees centigrade.

18. A superabrasive compact of claim 12 wherein said first layer is adhered to said walls.

19. A ceramic impregnated superabrasive compact comprising:
a preform comprised of self-bonded, monolithic, polycrystalline, superabrasive material, said preform having a thermally stable portion extending from a surface thereof to a depth of at least approximately 100 microns below said surface, said thermally stable portion having an open void volume of from about 2 to 10 percent and substantially no blind void volume, said open void volume being generally in the form of a reticulated network of pores, said reticulated network of pores having walls, wherein more than 95 percent of said pores have a size of less than about 3,000 nanometers; and
a formed in situ ceramic deposit filling at least about 70 percent of said void volume, said ceramic deposit being formed against said walls and being effectively undissolved and unreacted with said superabrasive material, said formed in situ ceramic deposit being caused by infiltrating a pre-existing said reticulated network of pores with a liquid pre-ceramic and converting the resulting infiltrated liquid pre-ceramic into said formed in situ ceramic deposit.

20. A ceramic impregnated superabrasive compact of claim 19 wherein said thermally stable portion includes substantially all of said preform.

21. A ceramic impregnated superabrasive compact of claim 19 wherein said formed in situ ceramic deposit includes at least two layers.

* * * * *